United States Patent
Long

(10) Patent No.: US 8,413,540 B2
(45) Date of Patent: Apr. 9, 2013

(54) ROBOT ARM ASSEMBLY AND INDUSTRIAL ROBOT USING THE SAME

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 331 days.

(21) Appl. No.: 12/732,379

(22) Filed: Mar. 26, 2010

(65) Prior Publication Data
US 2011/0113917 A1 May 19, 2011

(30) Foreign Application Priority Data
Nov. 19, 2009 (CN) .......................... 2009 1 0309978

(51) Int. Cl.
B25J 17/00 (2006.01)
B25J 17/02 (2006.01)
B25J 18/00 (2006.01)
H02K 7/116 (2006.01)

(52) U.S. Cl.
USPC .................... 74/490.05; 74/421 A; 74/490.01

(58) Field of Classification Search ................. 74/421 A, 74/490.01, 490.03, 490.05, 490.06
See application file for complete search history.

(56) References Cited

U.S. PATENT DOCUMENTS

| 4,147,071 | A | * | 4/1979 | Scribner et al. ................. 74/409 |
| 4,831,893 | A | * | 5/1989 | Obama et al. .............. 74/490.05 |
| 5,588,328 | A | * | 12/1996 | Nihei et al. ..................... 74/409 |
| 6,699,152 | B2 | * | 3/2004 | Tanaka .......................... 475/149 |
| 2011/0023640 | A1 | * | 2/2011 | Hanson et al. ............. 74/421 A |
| 2011/0048158 | A1 | * | 3/2011 | Maisonnier et al. ........ 74/490.03 |
| 2011/0126661 | A1 | * | 6/2011 | Long .......................... 74/490.05 |

FOREIGN PATENT DOCUMENTS
CN 1112474 A 11/1995
WO WO 2006085819 A2 * 8/2006

* cited by examiner

Primary Examiner — Justin Krause
(74) Attorney, Agent, or Firm — Altis Law Group, Inc.

(57) ABSTRACT

A robot arm assembly includes a middle joint, an upper arm rotatably connected to the middle joint, a driver rotating the upper arm mounted on the middle joint, and a transmission mechanism transferring the power of the driver to the upper arm. The driver includes an output shaft. The transmission mechanism includes a first gear coupled to the output shaft of the driver, a second gear mounted on the outer circumference of the arm, a third gear meshed with the first gear, and a fourth gear coinciding with the third gear and meshed with the second gear.

20 Claims, 3 Drawing Sheets

ROBOT ARM ASSEMBLY AND INDUSTRIAL ROBOT USING THE SAME

BACKGROUND

1. Technical Field

The present disclosure generally relates to robot technologies, and particularly to a robot assembly and an industrial robot using the robot assembly.

2. Description of the Related Art

Referring to FIG. 3, a typical six-axis robot 100 is schematically shown. The robot 100 includes a base 11, a bracket 12 rotatably connected to the base 11, a lower arm 13 rotatably connected to the bracket 12, a middle joint 14 connected to the lower arm 13, an upper arm 15 rotatably connected to the middle joint 14 and an end joint 30 rotatably connected to the end of the upper arm 15. The bracket 12, the lower arm 13, the middle joint 14 and the upper arm 15 are capable of rotating about a first axis 161, second axis 162, third axis 163 and fourth axis 164, respectively. The end joint 30 includes a fifth shaft (not shown) rotatably connected to the upper arm 15 and a sixth shaft (not shown) rotatably connected to the fifth shaft. The fifth and sixth shafts are capable of rotating about a fifth axis 165 and sixth axis 166, respectively. An actuator, such as a cutting tool, a clamping tool or a detector can be mounted on the sixth shaft to perform a predetermined action.

Generally, the robot 100 is provided with an electric motor and a reducer (not shown) to drive the upper arm 15. The reducer may be a rotary vector (RV) reducer or a harmonic drive (HD) reducer. However, both the RV reducer and the HD reducer are relatively expensive. In addition, the cables which are connected to the RV reducer or the HD reducer for supplying power or control signal directions have to be received inside the upper arm 15, and as a result may be damaged by abrasion or twisting.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
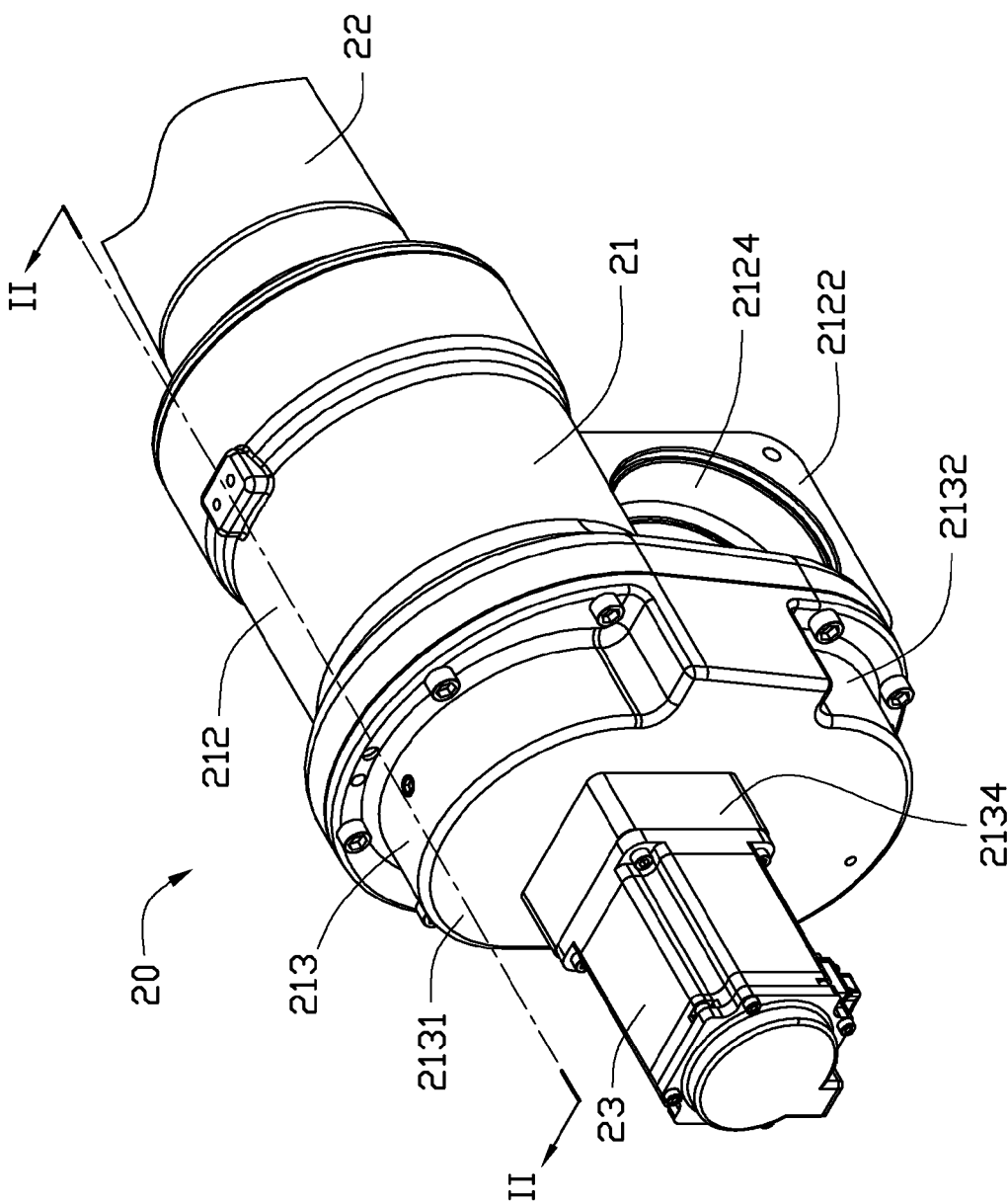
FIG. 1 is an isometric view of a robot arm assembly, the robot arm assembly utilized in an embodiment of an industrial robot.
Figure 2:
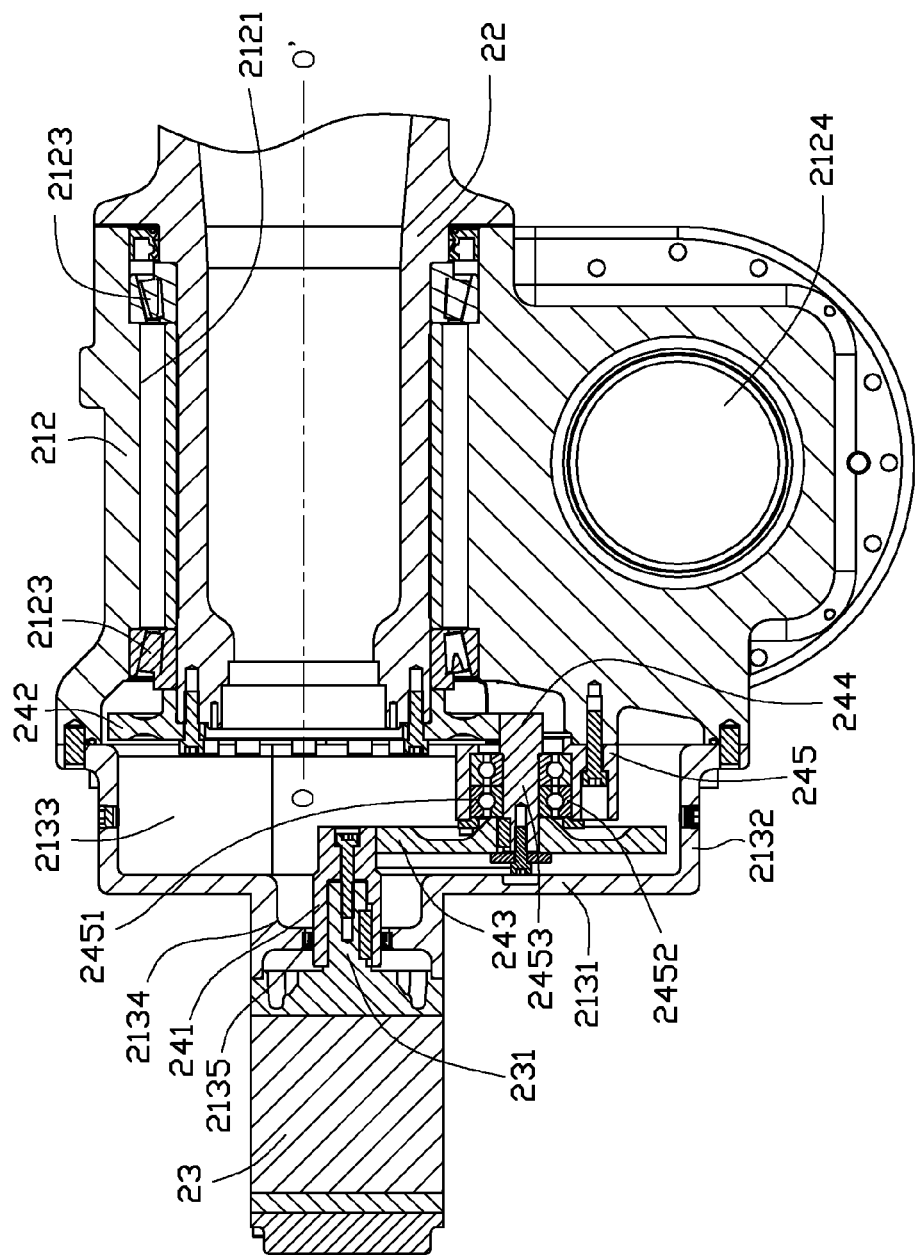
FIG. 2 is a cross section of an embodiment of a robot arm assembly, utilized in an industrial robot, such as, for example, that of FIG. 1, the cross section taken along line II-II.

Referring to FIGS. 1 and 2, a robot arm assembly 20 as disclosed in an embodiment includes a middle joint 21, an upper arm 22 rotatably connected to the middle joint 21, a driver 23 having an output shaft 231, and a transmission mechanism (not labeled) positioned between the upper arm 22 and the driver 23 for providing power to the upper arm 22.

The middle joint 21 includes a first support portion 212 and a second support portion 213 fixed to the first support portion 212.

The first support portion 212 is substantially cylindrical and defines a first mounting hole 2121 extending therethrough. An end of the upper arm 22 is rotatably received in the first mounting hole 2121. Two first bearings 2123 are received in opposite ends of the first mounting hole 2121 to rotatably support the upper arm 22. The first support portion 212 further includes a connection portion 2122 extending from the outer surface of the first support portion 212 along an axis perpendicular to the first support portion 212. The connection portion 2122 defines a first assembly hole 2124 therein whereby the robot arm assembly 20 is mounted to a rotation mechanism, for example, an arm of an industrial robot.

The second support portion 213 includes a bottom surface 2131 and a sidewall 2132 extending substantially perpendicular from an outer edge of the bottom surface 2131. The bottom surface 2131 and the sidewall 2132 cooperatively define a receiving space 2133. The side of the sidewall 2132 away from the bottom surface 2131 is fixed to the first support portion 212. The receiving space 2133 communicates with the first mounting hole 2121 of the first support portion 212. The bottom surface 2131 forms an assembly seat 2134 thereon. The assembly seat 2134 defines a second assembly hole 2135 to receive the output shaft 231 of the driver 23.

The driver 23 may be an electric servo motor mounted on the assembly seat 2134 of the second support portion 213. The output shaft 231 is rotatably received in the second assembly hole 2135 to couple to the transmission mechanism, such that the cables connected to the driver 23 can be drawn from external space of the middle joint 21, and thus abrasion between the cables and the upper arm 22 can be avoided.

The transmission mechanism is partially received in the receiving space 2133 and includes a first gear 241 fixed to the output shaft 231 of the driver 23, a second gear 242 mounted on the outer circumference of the upper arm 22, a third gear 243 meshed with the first gear 241, and a fourth gear 244 meshed with the second gear 242. The fourth gear 244 coincides with the third gear 243.

The transmission mechanism further includes a shaft seat 245 secured in the first support portion 212 and defining a second mounting hole 2451, and a gear shaft 2453 rotatably received in the second mounting hole 2451 and supported by two ball bearings 2452. The third and fourth gears 243, 244 are mounted on opposite ends of the gear shaft 2453, respectively. Alternatively, the gear shaft 2453, the third gear 243, and the fourth gear 244 may be integrally formed. The upper arm 22 is driven to rotate about the central axis OO' of the upper arm.

In the illustrated embodiment, the first, second, third, and fourth gears 241, 242, 243, 244 are straight-tooth involute gears. The rotation axes of the output shaft 231, the second gear 242 and the third gear 243, and also the upper arm 22 are substantially parallel and mutually offset. Requiring no RV reducer or HD reducer, the robot arm assembly 20 has a lower cost, larger capacity and improved stability.

Figure 3:
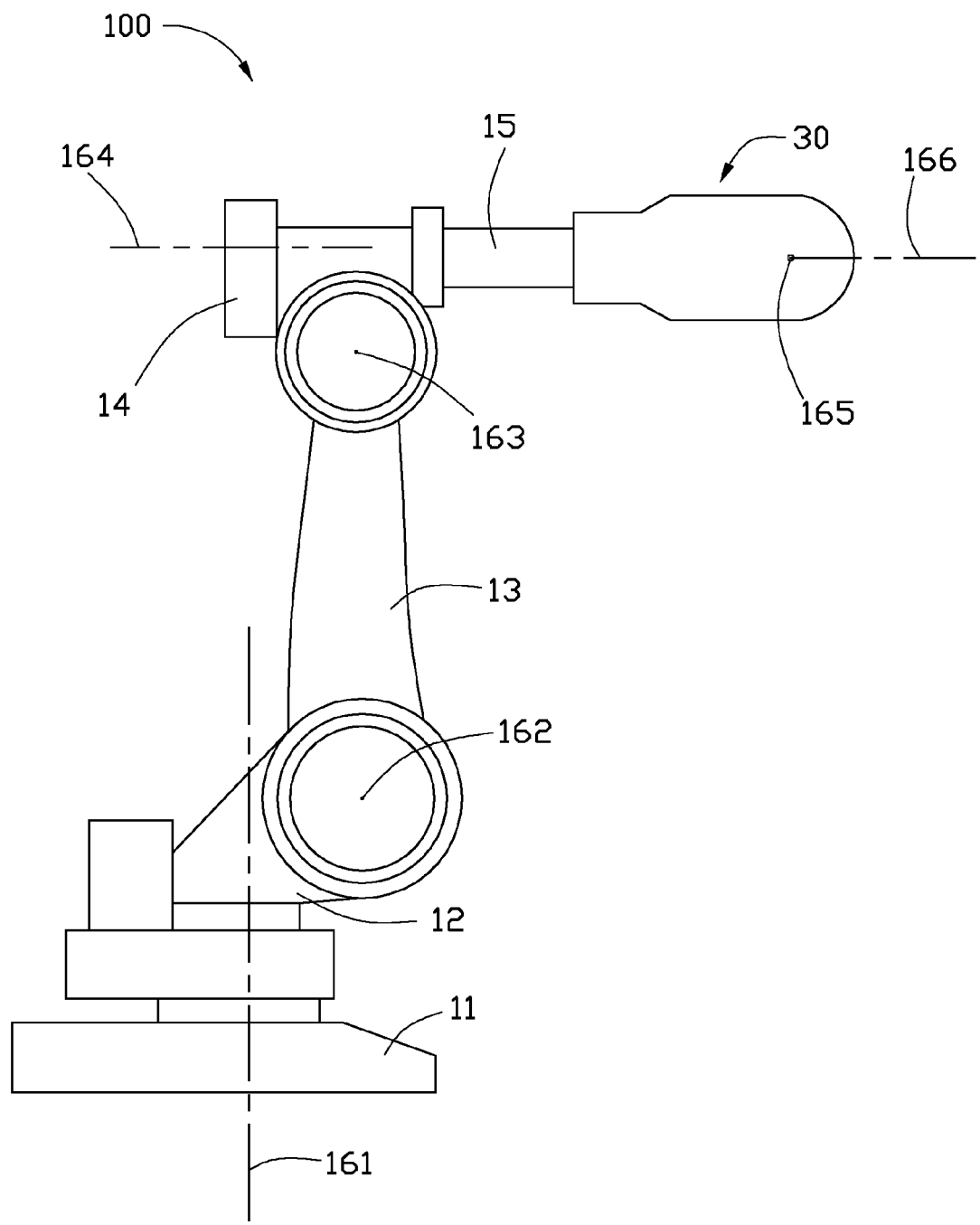
FIG. 3 is a schematic plan view of a commonly used six-axis robot employing a standard robot arm assembly.

Referring to FIG. 1 again, an embodiment of an industrial robot (not labeled) according to the present invention is similar to the six-axis industrial robot of FIG. 3, but employs the robot arm assembly 20 as disclosed. The upper arm 22 rotates about the fourth axis 164, and an end of the lower arm 14 is connected to the middle joint 213 via the second assembly hole 2124. An end joint 30 is rotatably connected to the upper arm 22. The industrial robot employing the robot arm assembly 20 supports a larger capacity and provides improved stability and more accurate positioning.

It is believed that the present embodiments and their advantages will be understood from the foregoing description, and it will be apparent that various changes may be made thereto without departing from the spirit and scope of the embodi-

What is claimed is:

1. A robot arm assembly comprising:
a middle joint;
an upper arm rotatably connected to the middle joint, wherein the upper arm is substantially cylindrical and a central axis is defined along a length of the upper arm;
a driver rotating the upper arm, wherein the driver is mounted on the middle joint and comprises an output shaft; and
a transmission mechanism transferring the power of the driver to the upper arm, wherein the transmission mechanism comprises a first gear coupled to the output shaft of the driver, a second gear mounted on the outer circumference of the upper arm, a third gear meshed with the first gear, and a fourth gear coinciding with the third gear and meshed with the second gear such that the upper arm is driven to rotate about the central axis of the upper arm.

2. The robot arm assembly of claim 1, wherein the middle joint comprises a first support portion, the first support portion defines a first mounting hole therein, at least one first bearing is received in the first mounting hole, and the upper arm is rotatably received in the first mounting hole and supported by the at least one first bearing.

3. The robot arm assembly of claim 2, wherein the first support portion further comprises a connection portion extending from the outer surface of the first support portion along an axis perpendicular to the first support portion, and the connection portion defines an assembly hole therein.

4. The robot arm assembly of claim 2, wherein the middle joint further comprises a second support portion fixed to the first support portion, and the first support portion and the second support portion cooperatively define a receiving space in which the transmission mechanism is partially received.

5. The robot arm assembly of claim 4, wherein the second support portion comprises a bottom surface and a sidewall extending substantially perpendicularly from an outer edge of the bottom surface, the side of the sidewall away from the bottom surface is fixed to the first support portion, the receiving space communicates with the first mounting hole of the first support portion, the bottom surface forms an assembly seat thereon, and the assembly seat defines an assembly hole to receive the output shaft of the driver.

6. The robot arm assembly of claim 4, further comprising a shaft seat secured in the second support portion.

7. The robot arm assembly of claim 6, further comprising a gear shaft, wherein the gear shaft is rotatably received in a second mounting hole defined in the shaft seat and is supported by two ball bearings, and the third gear and the fourth gear are mounted on opposite ends of the gear shaft.

8. The robot arm assembly of claim 1, wherein the driver is an electric servo motor.

9. The robot arm assembly of claim 1, wherein the central axis of the upper arm and the rotation axes of the output shaft of the driver, the second gear and the third gear are parallel and mutually offset.

10. The robot arm assembly of claim 1, wherein the first, second, third and fourth gears are a plurality of straight-tooth involute gears.

11. An industrial robot comprising:
a robot arm assembly rotatable about a rotation axis, and an end joint rotatably connected to the robot arm assembly, wherein the robot arm assembly comprises:
a middle joint;
an upper arm rotatably connected to the middle joint, wherein the upper arm is substantially cylindrical and a central axis is defined along a length of the upper arm;
a driver rotating the upper arm, mounted on the middle joint and comprising an output shaft; and
a transmission mechanism transferring the power of the driver to the upper arm, wherein the transmission mechanism comprises a first gear coupled to the output shaft of the driver, a second gear mounted on the outer circumference of the upper arm, a third gear meshed with the first gear, and a fourth gear coinciding with the third gear and meshed with the second gear such that the upper arm is driven to rotate about the central axis of the upper arm.

12. The industrial robot of claim 11, wherein the middle joint comprises a first support portion, the first support portion defines a first mounting hole therein, at least one first bearing is received in the first mounting hole, and the upper arm is rotatably received in the first mounting hole and supported by the at least one first bearing.

13. The industrial robot of claim 12, wherein the first support portion further comprises a connection portion extending from the outer surface of the first support portion along an axis perpendicular to the first support portion, and the connection portion defines an assembly hole therein.

14. The industrial robot of claim 12, wherein the middle joint further comprises a second support portion fixed to the first support portion, and the first support portion and the second support portion cooperatively define a receiving space in which the transmission mechanism is partially received.

15. The industrial robot of claim 14, wherein the second support portion comprises a bottom surface and a sidewall extending substantially perpendicularly from an outer edge of the bottom surface, the side of the sidewall away from the bottom surface is fixed to the first support portion, the receiving space communicates with the first mounting hole of the first support portion, the bottom surface forms an assembly seat thereon, and the assembly seat defines an assembly hole to receive the output shaft of the driver.

16. The industrial robot of claim 14, wherein the robot arm assembly further comprises a shaft seat secured in the second support portion.

17. The industrial robot of claim 16, further comprising a gear shaft, wherein the gear shaft is rotatably received in a second mounting hole defined in the shaft seat and is supported by two ball bearings, and the third gear and the fourth gear are mounted on opposite ends of the gear shaft.

18. The industrial robot of claim 11, wherein the central axis of the upper arm and the rotation axes of the output shaft of the driver, the second gear and the third gear are parallel and mutually offset.

19. The industrial robot of claim 11, wherein the first, second, third and fourth gears are a plurality of straight-tooth involute gears.

20. The industrial robot of claim 11, wherein the driver is an electronic servo motor.

* * * * *